US009890057B2

(12) United States Patent
Houston

(10) Patent No.: US 9,890,057 B2
(45) Date of Patent: *Feb. 13, 2018

(54) SYSTEM AND METHOD FOR ON SITE AERIAL DISSEMINATION AND ATMOSPHERIC DISPOSAL OF ALL LEACHATES AND WASTEWATERS

(71) Applicant: Kelly K. Houston, Cornelius, NC (US)

(72) Inventor: Kelly K. Houston, Cornelius, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/070,630

(22) Filed: Mar. 15, 2016

(65) Prior Publication Data
US 2016/0194216 A1 Jul. 7, 2016

Related U.S. Application Data

(63) Continuation-in-part of application No. 14/519,163, filed on Oct. 21, 2014.
(Continued)

(51) Int. Cl.
C02F 1/04 (2006.01)
C02F 1/12 (2006.01)
(Continued)

(52) U.S. Cl.
CPC .............. C02F 1/12 (2013.01); B05B 1/207 (2013.01); B05B 7/0075 (2013.01);
(Continued)

(58) Field of Classification Search
CPC .......... B05B 1/207; B05B 7/30; B05B 13/005
See application file for complete search history.

(56) References Cited

U.S. PATENT DOCUMENTS 2,684,949 A 7/1954 McMillan
2,768,859 A 10/1956 Patterson
(Continued)

FOREIGN PATENT DOCUMENTS

EP 2223593 A1 9/2010
WO 0177027 A1 10/2001

OTHER PUBLICATIONS

Request for Ex Parte Reexamination of U.S. Pat. No. 8,926,792 Pursuant to 37 C.F.R. Sec. 1.510 submitted Jun. 18, 2015; System and Method for Disposing of Leachate and Wastewater; Reexamination Control No. 90/013,530.
(Continued)

Primary Examiner — Benjamin F Fiorello
(74) Attorney, Agent, or Firm — Coats & Bennett PLLC

(57) ABSTRACT

A method and system for on-site aerial dissemination of oxidatively converted particles with substantial atmospheric disposal of the water component of all regulated and defined leachates and regulated and defined wastewaters. These leachates and wastewaters (defined as water containing 2 or more detectable regulated, defined and known contaminants) may include collecting the leachate or wastewater, having multiple contaminating suspended and perhaps precipitated solids therein, and aerially disseminating and disposing of said leachate or wastewater on the site of its generation. The defined leachate or wastewater is directed to an "Integrated Mobile Aerosolization System (IMAS)" having a turbine and being fully integrated and mobile. Thereafter, the mixture is directed from the IMAS and the contaminants aerially disseminated and disposed of over a defined and designated area on the site where the defined leachate or wastewater is created.

18 Claims, 4 Drawing Sheets

Related U.S. Application Data

(60) Provisional application No. 61/895,142, filed on Oct. 24, 2013.

(51) Int. Cl.

| | | |
|---|---|---|
| *B05B 1/20* | (2006.01) | |
| *B05B 7/00* | (2006.01) | |
| *B05B 7/30* | (2006.01) | |
| *B05B 7/32* | (2006.01) | |
| *B05B 13/00* | (2006.01) | |
| *B09B 1/00* | (2006.01) | |
| *B09C 1/00* | (2006.01) | |
| *B09C 1/08* | (2006.01) | |
| *B05D 1/02* | (2006.01) | |
| *C09K 17/00* | (2006.01) | |
| *C02F 103/06* | (2006.01) | |

(52) U.S. Cl.
CPC .............. *B05B 7/0081* (2013.01); *B05B 7/30* (2013.01); *B05B 7/32* (2013.01); *B05B 13/005* (2013.01); *B05D 1/02* (2013.01); *B09B 1/004* (2013.01); *B09C 1/00* (2013.01); *B09C 1/08* (2013.01); *C02F 1/048* (2013.01); *C09K 17/00* (2013.01); *B09B 2220/00* (2013.01); *B09C 2101/00* (2013.01); *C02F 2103/06* (2013.01); *C02F 2201/008* (2013.01); *Y02W 30/32* (2015.05)

(56) References Cited

U.S. PATENT DOCUMENTS

| | | | |
|---|---|---|---|
| 2,840,300 | A | 6/1958 | Carr |
| 3,979,061 | A | 9/1976 | Kircher |
| 4,397,422 | A | 8/1983 | Gwyn |
| 4,519,338 | A | 5/1985 | Kramer |
| 4,597,524 | A | 7/1986 | Albertsson |
| 4,919,331 | A | 4/1990 | Kosik, Sr. |
| 5,082,500 | A | 1/1992 | Nachtman |
| 5,167,367 | A | 12/1992 | VanderKelen |
| 5,169,783 | A | 12/1992 | Kieft |
| 5,400,966 | A | 3/1995 | Weaver |
| 5,564,628 | A | 10/1996 | Hall |
| 5,726,405 | A | 3/1998 | White |
| 5,836,513 | A | 11/1998 | Smith |
| 6,223,995 | B1 | 5/2001 | Evans |
| 6,378,778 | B1 | 4/2002 | Luras |
| 6,436,296 | B1 | 8/2002 | White |
| 6,464,148 | B1 | 10/2002 | Costa |
| 6,558,079 | B1 | 5/2003 | Kozak |
| 6,742,718 | B2 | 6/2004 | Doebler |
| 7,585,413 | B2 | 9/2009 | Hoffland |
| 7,604,710 | B2 | 10/2009 | Haslem |
| 7,622,044 | B2 | 11/2009 | Grott |
| 7,955,419 | B2 | 6/2011 | Casella |
| 8,256,748 | B1 | 9/2012 | Boulter |
| 8,524,089 | B2 | 9/2013 | Tsai |
| 8,636,267 | B1 | 1/2014 | Boulter |
| 8,657,941 | B2 | 2/2014 | Hutchinson |
| 8,740,195 | B2 | 6/2014 | Schneider |
| 8,926,792 | B1 | 1/2015 | Houston |
| 2005/0084334 | A1 | 4/2005 | Shi |
| 2005/0191132 | A1 | 9/2005 | Terrel |
| 2005/0220542 | A1 | 10/2005 | Marsh |
| 2007/0102154 | A1 | 5/2007 | Grott |
| 2007/0186778 | A1 | 8/2007 | Peterson |
| 2010/0126340 | A1 | 5/2010 | Peterson |
| 2011/0232495 | A1 | 9/2011 | Hutchinson |
| 2012/0085836 | A1 | 4/2012 | Tiu |
| 2012/0097763 | A1 | 4/2012 | Orubor |
| 2012/0152850 | A1 | 6/2012 | Tsai |
| 2013/0233782 | A1 | 9/2013 | Eppink |

OTHER PUBLICATIONS

Decision on Reexamination Request dated Aug. 12, 2015; Reexamination Control No. 90/013,530.
Sandy, Tom and DiSante, Cindy, Review of Available Technologies for the Removal of Selenium from Water, North American Metals Council, Jun. 2010, pp. xii, xiii, 4-22, and 4-23.
Jones-Lee, Anne and Lee, G. Fred, Appropriate Use of MSW Leachate Recycling in Municipal Solid Waste Landfilling, Air and Waste Management Association 93rd National Annual Meeting, Jun. 2000, pp. 4 and 5.
Office Action in Ex Parte Reexamination dated Oct. 26, 2015; Control No. 90/013,530.
Response to Office Action in Ex Parte Reexamination including Exhibits dated Jan. 26, 2016; Control No. 90/013,530.
Final Action in Ex Parte Reexamination dated Feb. 25, 2016; Control No. 90/013,530.

SYSTEM AND METHOD FOR ON SITE AERIAL DISSEMINATION AND ATMOSPHERIC DISPOSAL OF ALL LEACHATES AND WASTEWATERS

The present application is a continuation-in-part of U.S. patent application Ser. No. 14/519,163 filed Oct. 21, 2014 and claims priority to provisional U.S. Patent Application Ser. No. 61/895,142 filed on Oct. 24, 2013. These applications are incorporated in its entirety by reference herein.

FIELD OF THE INVENTION

The present invention relates to unfiltered or pre-conditioned or unprepared onsite systems and processes for aerially disseminating and atmospherically disposing of the water component of all leachates from sites regulated under the Resource Conservation and Recovery Act (RCRA) or commonly known as landfills and all other regulated and defined multi-contaminant containing wastewaters. The present invention also relates to systems and processes for aerial dissemination and atmospherically disposing of the water component of all other unprepared, or unfiltered or pre-conditioned aqueous solutions such as all defined wastewaters through a process where the defined aqueous solution is Atmospherically Converted (AC) or aerosolized as defined and known in the academic medical disciplines and with regard to military applications.

BACKGROUND OF THE INVENTION

Resource Conservation and Recovery Act (RCRA) regulated or commonly defined landfill leachates are the percolation and runoff or multi-contaminate containing discharge that occurs from and within RCRA regulated sites or landfills. This defined leachate is highly contaminated and typically includes large amounts of dissolved and undissolved organic matter, inorganic matter, heavy metals and a host of other known and unknown but regulated contaminants. This defined leachate or all other defined wastewaters are generally extremely regulated by federal, state and local governments and their constituent environmental agencies and citizen legal groups. These institutions have declared RCRA regulated sites or landfill leachate, and all other defined wastewaters, to be a threat to local rivers, streams and soils, as well as municipal water supplies and ground water located in the general vicinity of RCRA regulated sites or landfills or all other regulated and defined wastewater generating sites.

Offsite transportation, management, treatment and disposal of RCRA regulated site or landfill leachate and all other declared or defined wastewaters are expensive and inefficient. Typically RCRA regulated and defined leachates and all other defined wastewaters are collected and may be transported off-site to a treatment facility or regulated under NPDES permits or Land Application (LA) permits. RCRA regulated leachates and all other defined wastewaters are typically collected in lined or unlined ponds or tanks and may be transferred to trucks that transport the defined leachate and all other defined wastewaters to prepared defined leachate or wastewater treatment plants or simply discharged into the environment under regulated or permitted conditions. It is the management, permitting, collection, transportation and treatment that make the process extremely expensive. It is not unusual for a typical sized RCRA regulated site or landfill, or all other regulated and defined wastewater producing site, to spend approximately $1 million dealing with the defined leachate or all other defined wastewaters either on or off site, annually.

SUMMARY OF THE INVENTION

In one embodiment, the present invention relates to a process for onsite and mobile aerosolization of RCRA defined unfiltered, unprepared or unconditioned leachates and all other similarly defined and generalized wastewaters. In one embodiment of the present invention, RCRA regulated and defined yet unpretreated leachates are directed to a mobile, self-contained and independent, high output air/water system that includes an adjustable turbine and a set of adjustable and interchangeable nozzles. The turbine can be powered either by electricity, diesel, gas, natural gas or other client described source and is driven and is directly integrated with the turbine, creating a system of air and defined leachates and all other defined wastewaters which flows in front of a strong wind stream created by the turbine. The motor, turbine and an integrated pump are all combined to create a unified, complete and mobile defined leachate and all other defined wastewater system that is capable of aerially disseminating, and atmospherically disposing of raw and defined leachates, or other similarly described raw wastewaters, on the site where they were generated. The defined leachates, or all other defined wastewaters, are pumped unfiltered or unconditioned or unprepared but under some pressure past the nozzles and the nozzles initiate a liquid particle dispersion (LPD) process of the raw leachate or wastewater into the path of the turbine system's high output air flow. This Liquid Particle Conversion (LPC) process, well known in the medical and military applications commonly known as aerosolization, forms a mobile and controllable mixture of air-raw leachate or air-raw wastewater that can be aerially disseminated and atmospherically dispose of the water component of the leachate or wastewater on the site where the defined leachate or all other defined wastewaters were generated. The "integrated and mobile aerosolization system (IMAS)" propels the multi-contaminant containing suspended and perhaps precipitated solids mixture of air-raw leachate or air-raw wastewater over the regulated and defined lined or unlined RCRA defined site or landfill, aerially disseminate suspended and precipitated solids over a designated and defined or permitted collection area. Much of either mixture is defined by containing clumped contaminants and a larger portion can be defined as atmospheric discharge as water vapor post inventive process and method. However, the air-raw leachate mixture or air-raw wastewater mixture includes suspended or precipitated contaminant solids and other elements or compounds of concern that Oxidatively Diffuse (OD) or Oxidatively Convert (OC) or aerosolize into a "Stage 1 Aerosol" during this process. Typically, in the case of a RCRA regulated site or landfill or other generally defined wastewater aerosolization application, for example, the multitude of contaminating suspended and perhaps precipitated solids, elements or compounds, which Oxidatively Diffuse (OD) these clumped particles onto the RCRA regulated site or landfill surface, lined or unlined designated or defined or permitted area may additionally promote the growth of vegetation.

In another particular embodiment, all defined wastewaters inherently contained in an unlined or lined contaminant containment area or lagoon is pumped or directed to the "IMAS." The defined wastewater is pumped under some pressure into the IMAS and finally through the nozzles for onsite aerial dissemination, atmospheric conversion and finally water vapor atmospheric disposal as described above.

The nozzles emit an aerial dissemination or atmospheric conversion or aerosol that is clumped, mixed and accelerated with the IMAS's airflow, which forms an air-raw wastewater mixture. The IMAS is mobile and thus very intentionally positioned and directed to propel the mixture of air-raw wastewater over the defined unlined or lined catch basin, lagoon, for example, where a substantial portion of the contaminants found in the suspended or precipitated solids in the defined wastewater is aerially disseminated into a regulated and defined or permitted area and the water component of the defined leachate or all other wastewater is released as water vapor into the atmosphere while solids, elements and all compounds of concern contained in the wastewater Oxidatively Diffuse (OD) into the unlined or lined catch basin, lagoon or other regulated or defined or permitted areas.

The aerial dissemination and atmospherically disposed water component is such that a substantial portion of the regulated and defined leachate or wastewater becomes a "Stage 1 Aerosol" and the contaminating suspended or perhaps precipitated solids, elements or compounds of concern contained in the regulated and defined leachate or wastewater further clump and fall onto a designated or a specific area such as an unlined or lined catch basin, lagoon or designated and permitted. A "fine mist" or "vaporization" or "water evaporation" is not created through this invention and the distance between the droplets is decreased and does not require ambient atmospheric conditions. Aerial dissemination and water component atmospheric disposal or commonly known aerosolization is the opposite of any mechanical atomization process but rather a medical term as understood by international military testing and applications and their associated medical academic and practical applications and deals with aerial chemical and biological dissemination into a known and defined area. Aerosolized particles would measure in the hundreds and thousands of microns in the regulated and permitted solids collection areas. The medical and military common term of aerosolization is intentionally chosen to describe this invention of untreated or filtered or conditioned on site wastewater aerial dissemination and considerable water component atmospheric disposal as a "Stage 1 Aerosol."

Other objects and advantages of the present invention will become apparent and obvious from a study of the following description and the accompanying drawings, which are merely illustrative of such invention.

DETAILED DESCRIPTION OF THE INVENTION

Figure 1:
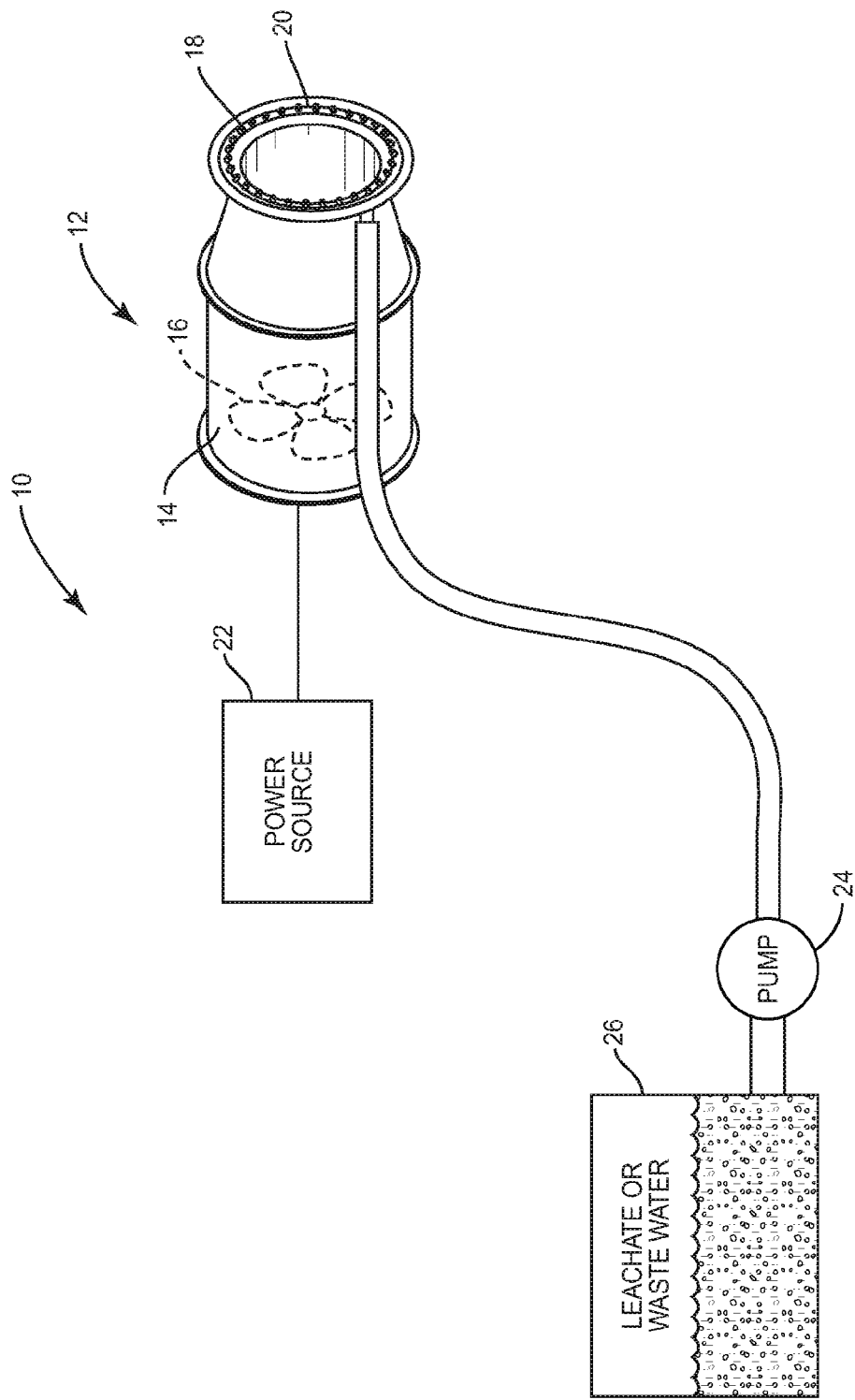
FIG. 1 is a schematic illustration for a system for aerially disseminating and atmospherically discharging water vapor also commonly known as aerosolizing a regulated and defined wastewater, such as RCRA regulated sites or landfill leachate or all other defined wastewaters, onsite and with an IMAS.
Figure 2:
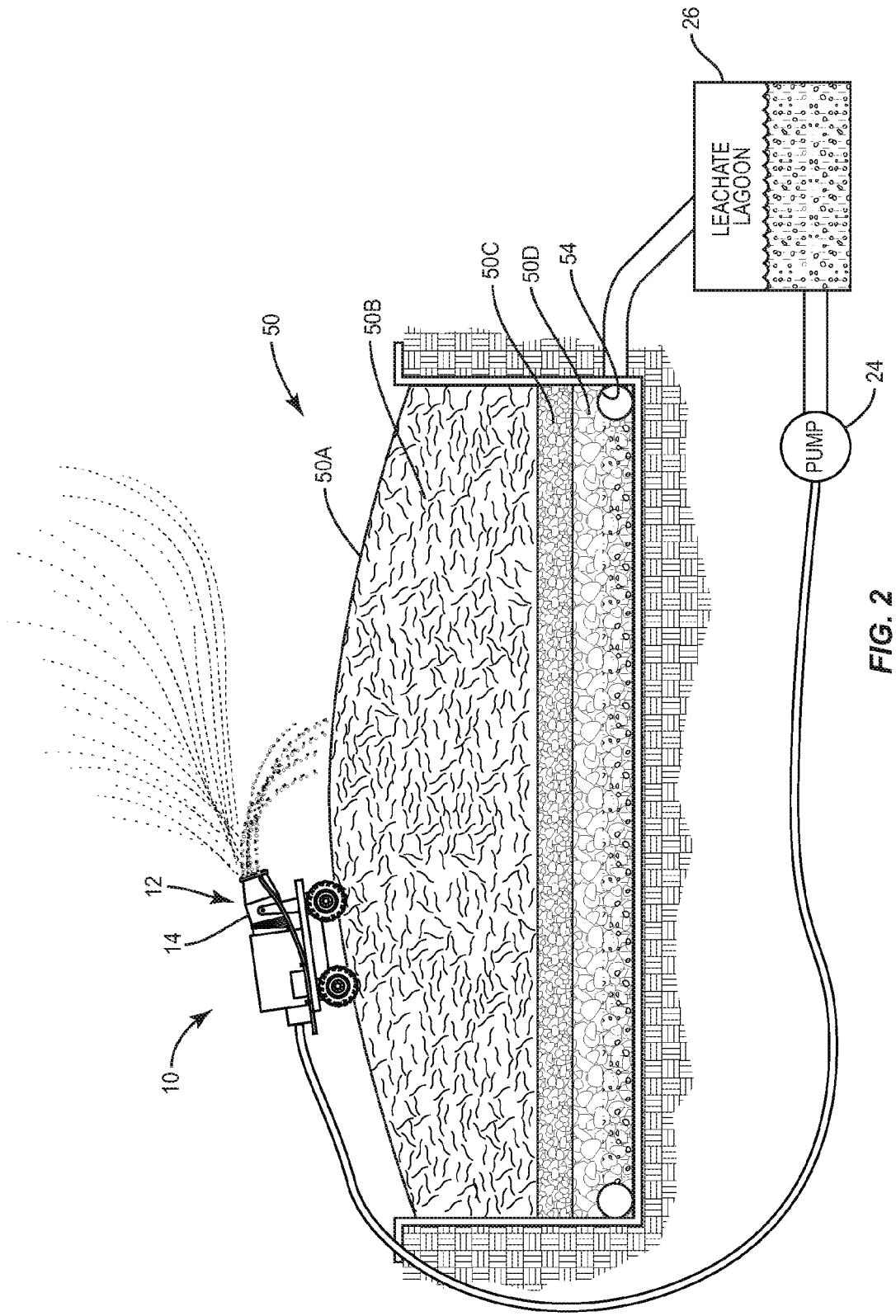
FIG. 2 is a schematic illustration of a RCRA regulated site or lined or unlined landfill illustrating the basic process of utilizing an IMAS to aerially disseminate or aerosolize a portion of the defined leachate while at the same time permitting the unfiltered and unconditioned and unprepared contaminating suspended and precipitated solids contained in the defined leachate to Oxidatively Diffuse (OD) or undergo liquid particle conversion (LPC) onto the RCRA regulated site which may be lined or unlined commonly known as landfill.

With further reference to the drawings, FIG. 1 shows a system for aerially disseminating and atmospherically disposing the water component of all types of regulated and defined wastewater and is indicated generally by the numeral 10. As will become apparent from the present disclosure, system 10 is used for aerially disseminating and atmospherically disposing of the water component as vapor of all defined and regulated wastewaters such as leachate, lagoon liquid waste, "frac flowback", or all other types of regulated and defined multi-component wastewaters, etc. Turning specifically to FIG. 1, the system 10 is shown therein includes an IMAS indicated generally by the numeral 12. IMAS 12 includes a conduit 14 that is configured to channel or direct air through the same. A relatively large turbine 16 is contained in the conduit 14 and can be mounted on a shaft and forms a part of the IMAS 12. As will be appreciated from subsequent portions of the disclosure, turbine 16 is driven such that it generates a system of air that moves through the conduit, from an inlet end to and through an outlet end. IMAS 12 also includes a regulated and defined and custom designed wastewater injection system for aerosolizing all regulated and defined wastewaters and injecting the aerosolized wastewater into the system of air passing through the conduit 14. This IMAS contains a series of adjustable and replaceable nozzles 18 that are secured and circumferentially spaced around a ring pipe or manifold 20. As will be appreciated from subsequent portions of the disclosure, defined wastewater being aerially disseminated or Oxidatively Diffused (OD) or aerosolized by the IMAS 12 is directed under some pressure into the manifold 20 and from the manifold the defined wastewater is aerosolized outwardly from the series of nozzles 18. As seen in FIG. 2, the nozzles are oriented about an outlet end portion of the conduit 14. Further, the nozzles 18 are directed inwardly such that the Atmospheric Discharge (AD) or aerosolized wastewater is directed inwardly towards the center of the conduit 14. As discussed later herein, the Aerial Particle Converted (APC) or aerosolized defined wastewater mixes with the system of air passing through the conduit to form an air-defined wastewater mixture also known as Oxidative Diffusion (OD). In one embodiment, as discussed below, the defined wastewater is a RCRA regulated and defined leachate multi-component solution that is produced by a commonly known landfill which maybe lined or unlined. This defined leachate containing a multi-component contaminant suspended and perhaps precipitated solid solution is aerosolized or Aerially Disseminated (AD) by the nozzles 18 and injected into the stream of air passing through the conduit and Oxidatively Diffusing (OD) or clumping the defined and regulated contaminating suspended and precipitated contaminating solids 14.

To provide power to the IMAS 12 and particularly to drive the turbine 16, there is provided an integrated power source 22. Various types and forms of power sources can be utilized. In one embodiment the power source is a diesel or gasoline or natural gas powered internal combustion engine that is operatively connected to a drive shaft that drives the turbine 16. In another embodiment, the power source can be comprised of an electric motor operatively connected to the drive shaft of the turbine 16 and wherein an integrated and conventional generator powers the electric motor or other regulated site specified form.

Also forming a part of the system 10 is one or more integrated pumps 24. The function of the one or more pumps 24 is to pump the regulated and defined wastewater under some pressure into the manifold 20 and out the respective nozzles 18. In addition, the system 10 will include, in some embodiments, a tank or storage vessel for holding the regulated and defined wastewater to be Aerially Disseminated (AD) wastewater to include Oxidative Diffusion (OD) or commonly known as aerosolization. The holding tank is shown in FIG. 1 and referred to by the numeral 26.

FIG. 1 shows the conduit 14, as well as the circumferentially spaced nozzles 18, disposed around the outlet end of the conduit 14. As discussed above, air plus raw defined wastewater is injected into the air stream forms an air-raw wastewater mixture. The air functions at least partially as a carrier and partially as the Oxidative Diffusion (OD) method for the aerially disseminated or aerosolized raw wastewater. In addition, because of the velocity and energy associated with the moving stream of air that is being propelled from the outlet end of the conduit end 14, the system of air facilitates the further Liquid Particle Conversion (LPC) or Oxidative Particle Release (OPR) or commonly known as aerosolization of the wastewater. The IMAS 12 can be designed to propel the air-raw wastewater mixture a substantial distance from the outlet end of the IMAS, but it is not necessary. Typically, but not always, the IMAS 12 is mounted on a mobile platform such that it can be moved from point to point. Further, the conduit 14 is typically adjustably mounted on the platform. Around the platform and also can be rotated up and down such that the conduit 14 can effectively direct a stream of air including the aerially disseminated or aerosolized wastewater a substantial distance from the outlet end of the conduit 14. In some embodiments, the power imparted to the turbine 16 is operative to direct the air-raw wastewater mixture as much as 200 meters. Thus, with the numerous adjustment features associated with the conduit 14, the conduit can be aimed and directed in an infinite number of directions.

Various types of IMAS's can be utilized to aerially disseminate and atmospherically dispose of the water component of all regulated and defined wastewaters or defined leachates on the site where they were generated. For example, some forms of snow blowing, dust suppression or odor suppression machines can be utilized to aerially disseminate or aerosolize the regulated and defined wastewater or leachate. In the way of an example, one is referred to the dust suppression machine shown in WO2011/119229, the disclosure of which is expressly incorporated herein by reference.

The regulated and defined wastewater or leachate solution typically includes many contaminating suspended solids and in some cases precipitated solids. That is, the regulated and defined wastewater or leachate solution may include dissolved solids that through possible chemical processes prior to reaching the IMAS 12 causes the dissolved solids to precipitate. Filtering or conditioning or pre-preparing the regulated and defined wastewater or leachate solution is not necessary for aerial dissemination, commonly known as aerosolization and should not be associated with atomization or evaporation or misting processes or inventions. Aerosolization and Atomization are opposite scientific principles in their intent, purpose, use, equipment, measurement, testing and goals. Thus, in some cases, the regulated and defined wastewater or leachate solution includes both suspended solids and precipitants in their natural state and would be aerosolized in very high volumes and flow rates which is opposite from past atomization inventions. The basic approach for aerially disseminating or atmospherically converting or oxidatively diffusing or commonly known aerosolizing the regulated and defined wastewater or leachate solution is to directly pump the air-raw wastewater or air-raw leachate mixture from the outlet end of the conduit 14 such that the aqueous or water portion of the wastewater or leachate solution aerially disseminates or aerosolizes into the atmosphere. At the same time, the object is to permit the regulated and defined contaminating suspended or precipitated solids inherent in the wastewater or leachate solution to Oxidatively Diffuse (OD) out of the air-raw wastewater stream onto a regulated and defined and pre-selected unlined or lined area so as to be in compliance with existing federal, state and local laws, regulations and court opinions. As will be discussed later, in the case of aerially disseminating and atmospherically disposing of the water component of leachate from a RCRA defined landfill or all other regulated and defined wastewaters on the site of generation, it may be desirable to position the IMAS 12 such that inherent yet helpful solid minerals in the form of nitrogen, calcium or phosphorous compounds, for example, will aerially disseminate or aerosolize onto an area such that they may promote the growth of vegetation which is also regulated on these defined sites.

Turning to FIG. 2, shown therein is a particular application of the present invention. In this case, the IMAS 12 is utilized to aerially disseminate and atmospherically dispose of the water component of leachate produced by a RCRA regulated and defined site commonly known as a lined or unlined landfill indicated generally by the numeral 50. Before describing the process in more detail, it may be beneficial to briefly discuss the RCRA regulated and defined site commonly known as a lined or unlined landfill site 50. As illustrated in FIG. 2, the landfill site 50 includes an upper surface 50A. Disposed below the upper surface 50A is a depth of soil, waste, liner or in some cases unlined, legacy filtering systems, etc. (50B) that is continually mixed and turned during the course of the operation of the landfill if in operation or also contained in a closed site. Although the particular structure of a RCRA regulated and defined site or landfill can vary from location to location, in one embodiment there is provided a layer of gravel or sand 50C beneath the upper soil and waste layer and perhaps other legacy engineered linings or catch membranes. Below the layer of gravel can be a layer of rock 50D and below the layer rock is usually clay and is a retaining liner or other catch membranes but is not necessary in legacy sites before RCRA passage. The liner(s) or unlined but legacy engineered areas may stretch across the entire dimensions of the RCRA regulated and defined site or landfill and is basically utilized to attempt to retain and prevent regulated and defined leachate solutions from moving further downwardly into the underlying soil. A network of drainpipes 54 is typically, but no necessarily, employed just above a liner(s) system, if built after RCRA passage, and is utilized to collect the leachate solution and channel the leachate solution to a regulated, defined or permitted holding tank, catch basin or lagoon. Once in the regulated, defined and or permitted holding area, the leachate solution can be Aerially Disseminated (AD) or Oxidatively Diffused (OD) such that the water component is atmospherically discharged or disposed of continuously or periodically. In order to aerially disseminate and atmospherically discharge or dispose of the water component of any leachate solution, one or more pumps 24 are utilized to pump the defined leachate solution from the holding area under some pressure 26 to the IMAS 12. More particularly, the one or more pumps pump the defined leachate solution, in its natural unfiltered or unconditioned state, into the manifold 20 where Liquid Particle Dispersion (LPD) or Liquid Particle Conversion (LPC) or Liquid Particle Release (LPR) is initiated into the water component of the raw leachate solution about the outlet end of the conduit 14. Once in the manifold 20, the defined leachate solution under some pressure is forced out the circumferentially spaced nozzles 18 into the path of a system of air that is generated by the turbine to initiate Oxidative Diffusion (OD) or Oxidative Conversion (OC) or Oxidative Particle Release (OPR) all known methods or processes in the medical or military disciplines and commonly known as aerosolization 16 in the conduit 14. As noted above, as this system or stream of air exits the outward end of the conduit 14, the now aerosolized raw leachate mixes with the directed air to form the Oxidatively Diffused (OD) air-raw leachate solution mixture. The fluid and airflow pressure applied to the leachate upstream of the nozzles can vary widely depending on the type and consistency of the defined leachate or wastewater. In one example, the pressure is maintained between 20 psi and 160 psi. Further, the nozzles can be selected by a person of ordinary skill in the art to provide the degree of Aerial Dissemination (AD) or Oxidative Diffusion (OD) or aerosolization necessary or appropriate to optimize the efficiency of the IMAS and still remain in compliance with all federal, state and local laws as well as client directed constraints 12.

As seen in FIG. 2, in one embodiment the IMAS 12 is placed at the apex or center of the RCRA regulated site or landfill 50. From that point, the conduit 14 can be moved and manipulated over time to direct the air-raw leachate mixture over substantially the entire upper surface 50A of the RCRA regulated site or landfill area. As noted above, in one example the throw of the IMAS 12 may be as much as 200 meters and must be contained by existing legal and permitting constraints. Thus, as illustrated in FIG. 2, a substantial portion of the aerially disseminated or aerosolized leachate solution entering the stream of air will effectively be Atmospherically Discharged (AD) or aerosolized into the atmosphere above and around the RCRA regulated site or landfill 50. As much as 60-80 percent of the raw or unfiltered or unconditioned leachate solution can be Oxidatively Diffused (OD) and Atmospherically Discharged (AD) or commonly known as aerosolized into the atmosphere. As also noted above, the defined leachate solution will inherently include multiple regulated and defined contaminates to include suspended and possibly precipitated solids that will Oxidatively Diffuse (OD) out of the air stream within a shorter distance as defined by legal and permitting guidelines and vary by each regulated and defined and permitted site. For example, some suspended and precipitated contaminating solids could be expected to aerially disseminate in the area of 1 to 200 meters from the outlet end of the conduit 14. These suspended and precipitated contaminating solids can range from calcium and phosphorus compounds to other minerals, elements or compounds that might aid in the growth and proliferation of vegetation.

The airflow range of the IMAS 12 can widely vary. It can vary widely based on active controls or it might vary widely based on environmental conditions, regulations or individual client specifications. In one example, the speed of the turbine 16 can be varied so as to adjust the velocity of the air and the energy imparted to the air. That will effectively control or adjust the aerial dissemination distance from the outlet end of the conduit 14. In addition, the flow rate and pressure of the regulated and defined wastewater or leachate solution going to and within the IMAS can be varied also. This will vary the degree of aerial dissemination or atmospheric discharge or commonly known liquid aerosolization and, it is postulated, will vary the efficiency of the overall defined wastewater or leachate solution aerosolization process. As a general rule, the higher the pressure for a given nozzle, the greater the aerosolization of the leachate or wastewater and the greater the aerosolization efficiency and water vapor component atmospheric disposal. Also, as a general rule, the larger the particle size and higher the particle weight the larger the nozzle size and configuration.

As noted above, in one embodiment, the IMAS 12 is mounted on a mobile platform and can be moved from location to location about the RCRA regulated and defined site or landfill. This, again, enables the inherent suspended and perhaps precipitated contaminating solids contained in the leachate solution to be intentionally and uniformly aerially disseminated over the entire upper surface 50A of the landfill. In addition, it may be advisable under certain permitted or regulated conditions to position the IMAS 12 around the periphery of the RCRA regulated and defined site or landfill. That is, the mobile platform could be positioned at various points around the periphery of the landfill with the outward end of the conduit 14 aimed up a slope of the landfill. This may improve the retention of suspended and precipitated solids on the upper surface 50A of the landfill and, depending on the composition and amount of liquid that actually Oxidatively Diffused (OD) out of the air-leachate mixture, this can minimize "washing" and the formation of small gullies that run down the sides of the RCRA regulated site or landfill.

Figure 3:
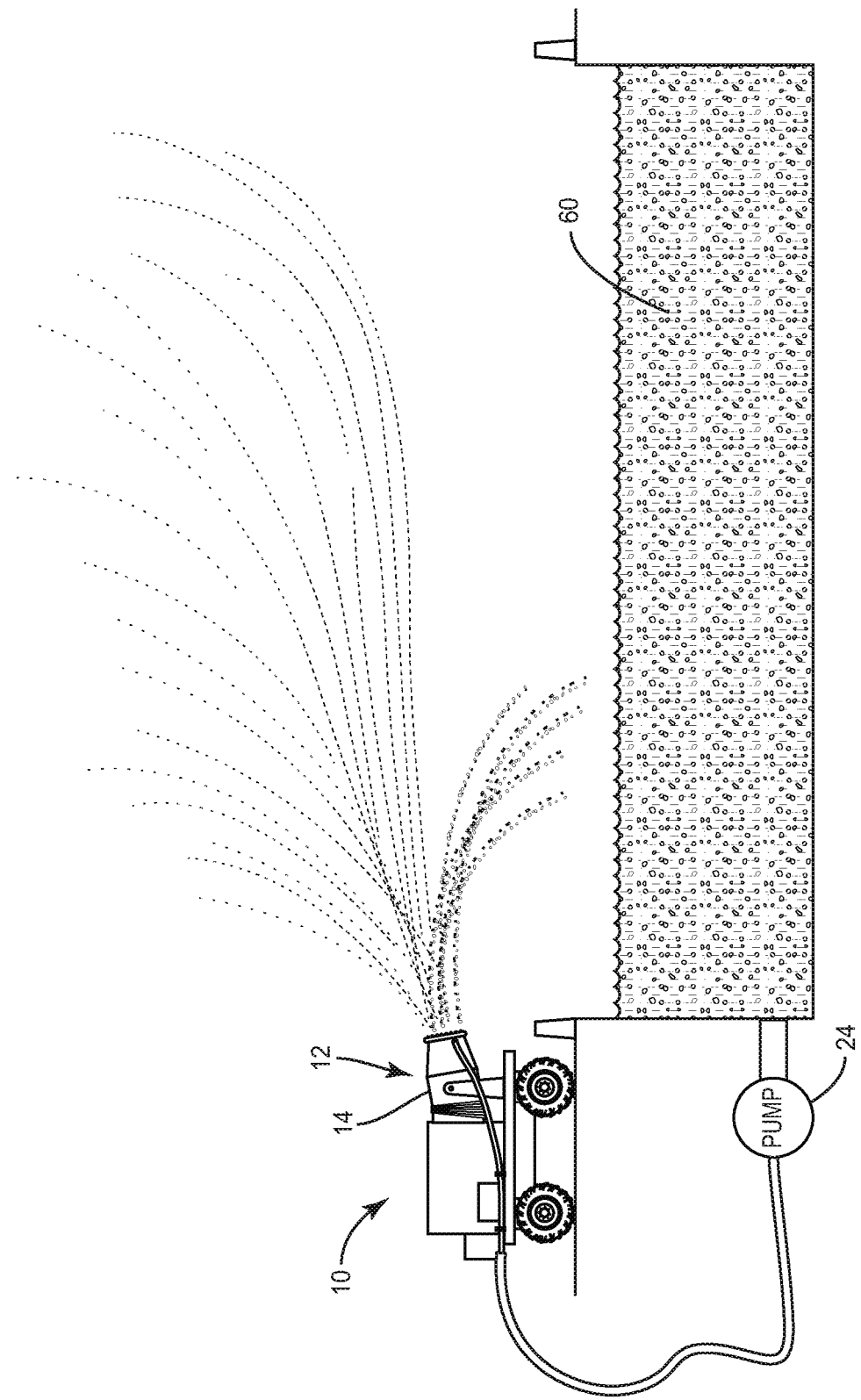
FIG. 3 is a schematic illustration showing the IMAS and aerial dissemination and including Liquid Particle Conversion (OLC) and Oxidative Diffusion (OD) or commonly known as an aerosolization process of the present invention being utilized to dispose of the water vapor component of any regulated and defined wastewater in an unlined or lined catch basin or lagoon.
Figure 4:
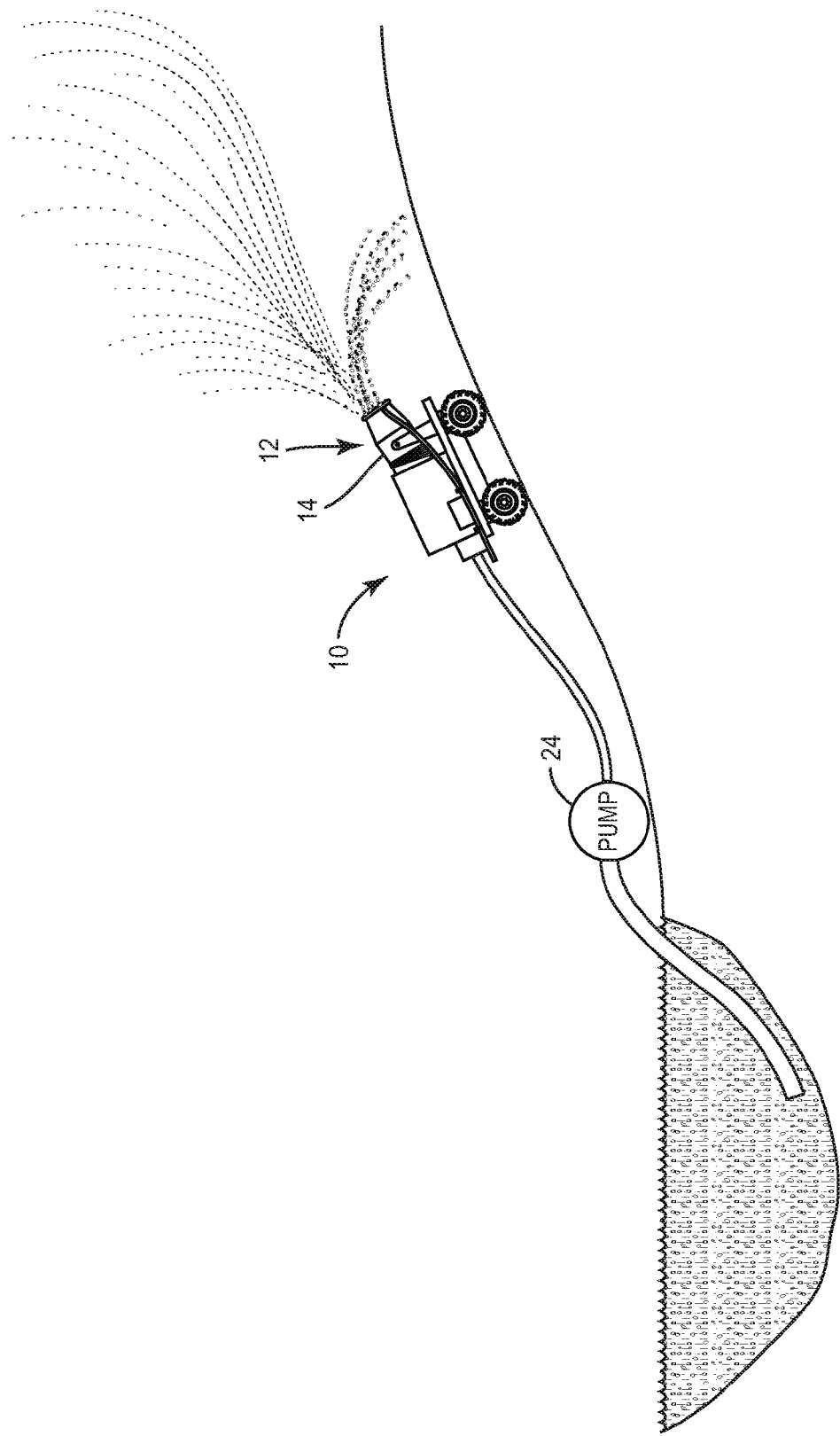
FIG. 4 is a schematic illustration similar to FIG. 3 showing the IMAS and the aerial dissemination and Oxidative Particle Release (OPR) or commonly known as aerosolized process of the present invention being utilized to separate the regulated and defined contaminating suspended and precipitated solids inherent in all defined wastewaters in a lined or unlined pond, lagoon or regulated and defined holding area where the defined wastewater is aimed over an area in close proximity to the regulated and defined or permitted lined or unlined pond, lagoon, catch basin or wastewater holding area.

Turning to FIG. 3, there is shown an example of utilizing the IMAS 10 of the present invention to aerially disseminate and atmospherically dispose of the water component of any regulated, defined multi-component and detectable wastewater on the site of its creation. In this case, the regulated and defined wastewater is contained within a lined or unlined catch basin or lagoon 60. The IMAS 12 is positioned adjacent to an edge of the lined or unlined catch basin or lagoon 60. The defined multi-detectable component wastewater in the catch basin or lagoon is pumped by one or more pumps 24 to the IMAS 12 and more particularly to the manifold 20 and the nozzles 18 supported thereon. The raw wastewater, having many components, under some pressure, is forced out the nozzles 18 and directed inwardly towards the passing air stream generated by the turbine 16. This forms the aerial dissemination or Oxidative Liquid Conversion (OLC) within the air-raw wastewater mixture.

The outlet end of the conduit 14 is aimed over the lined or unlined catch basin or lagoon. Thus, the Aerially Disseminated (AD) or Oxidatively Converted (OC) or common vernacular aerosolized wastewater in the air-raw wastewater mixture tends to be further Oxidatively Diffused (OD) as it moves with the air stream outwardly over the regulated and defined lined or unlined catch basin or lagoon. This enables a substantial portion of the water component of the regulated and defined wastewater, in some cases as much as 60-80%, to be Atmospherically Discharged (AD) into the atmosphere also commonly known as a conversion into a "Stage 1 Aerosol" over the lined or unlined catch basin or lagoon 60 or any other regulated, defined or permitted pre-selected area. At the same time, the regulated and defined wastewater will inherently include suspended and perhaps precipitated contaminating solids. These solids tend to quickly Aerially Disseminate (AD) or Oxidatively Diffuse (OD) or aerosolize out of the air-raw wastewater mixture over the lined or unlined but regulated and defined catch basin or lagoon. Thus, the inherent suspended and possibly precipitated contaminating solids quickly undergo Aerial Release (AR) of the water component of the wastewater while Oxidatively Diffusing (OD) the regulated and defined contaminants into the regulated and defined or permitted lined or unlined catch basin or lagoon and eventually can be further aerially disseminated or otherwise atmospherically disposed of by other regulated and defined and legally prescribed site appropriate means.

From the foregoing specification and discussion, it is seen that the process or method of the present invention is a; safe, effective, efficient and extremely economical way of aerially disseminating and atmospherically disposing of the water component to all regulated and defined leachates and wastewaters on the site where they are generated. The invention is effective and efficient because substantial portions of the aqueous or liquid portions of the regulated and defined wastewater are effectively Aerially Disseminated (AD) or Oxidatively Diffused (OD) or commonly known as aerosolized into the atmosphere. Still, the method or process of the present invention effectively deals with suspended solids and particularly precipitated contaminating chemical and biological solid contaminants because their disposition in the Oxidative Diffusion (OD) can be controlled and where regulated and defined and permitted site appropriate policies can be utilized in constructive and helpful ways such as in the case of RCRA regulated and defined leachate solutions on landfills or all other regulated or defined wastewaters where valuable minerals, elements or compounds are utilized as an effective fertilizer to promote the growth of onsite vegetation, which is also regulated and legally defined for each site.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An aerial method of disseminating and disposing of an unfiltered or unprepared wastewater, defined as water containing 2 or more contaminants having multiple suspended and precipitated solids: directing this wastewater to an independent integrated and mobile aerosolization system (IMAS); driving a turbine associated with the IMAS and generating a system of air that moves through the IMAS; pumping the wastewater under some level of pressure to a series of nozzles associated with the IMAS and creating an atmospheric conversion (AC) or substantial volume or air/liquid flow rate liquid with substantial clumped particle release or Oxidative Diffusion (OD) or commonly known as aerosolizing the wastewater directed from the nozzles into the system of air passing through the IMAS to form an Atmospheric Conversion in this air-raw wastewater mixture; and directing the air-raw wastewater mixture from the IMAS and aerially disseminating the air-raw wastewater mixture over a defined contaminant suspended and precipitated solids collection area where the multiple solids in the defined wastewater aerially disseminate out of Liquid Particle Suspension (LPS) from the air-raw wastewater mixture onto the designated solids collection area which is defined as between 1-200 meters from directly below the nozzles of the IMAS.

2. The method of claim 1 wherein the multiple contaminating suspended and precipitated solids defined collection area is an unlined or lined catch basin, lagoon or designated or permitted area, between 1-200 meters, from the nozzles and the method includes pumping the defined wastewater from the unlined or lined catch basin or lagoon to the IMAS and aerially disseminating or aerosolizing the air-raw wastewater mixture over the unlined or lined catch basin or lagoon.

3. The method of claim 1 wherein the designated and defined or permitted contaminating suspended and precipitated solids collection area is an area where the defined wastewater is located.

4. The method of claim 1 including directing the system of air through a conduit forming a part of the IMAS and aerially disseminating or atmospherically disposing of the water component or aerosolizing the defined wastewater inwardly from a ring pipe having the nozzles disposed thereon such that the defined wastewater is directed inwardly into the system of air passing through the conduit of the IMAS causing Oxidative Diffusion (OD).

5. The method of claim 1 including directing the system of air through a conduit forming a part of the IMAS and moving the conduit while aerially disseminating or aerosolizing the air-raw wastewater mixture over the designated and defined or permitted contaminating suspended or precipitated solids collection area while liberating the water component of the mixture through Atmospheric Conversion (AC) or Liquid Particle Release (LPR).

6. The method of claim 1 wherein the IMAS is mounted on a mobile platform and the method includes moving the IMAS from one location to another.

7. The method of claim 1 wherein the defined contaminating suspended and precipitated solids collection area includes the defined and lined or unlined catch basin, lagoon, other designated and permitted area or other defined or permitted wastewater holding area and the method includes positioning the IMAS adjacent to an edge of a lined or unlined catch basin, lagoon, other designated and permitted area or other water holding area having defined wastewater therein; and pumping the unfiltered or unprepared or pre-conditioned defined wastewater from the lined or unlined catch basin, lagoon or other defined wastewater holding area to the nozzles of the IMAS; and wherein the Atmospheric Conversion Solution (ACS) or air-raw wastewater mixture is aimed over the lined or unlined catch basin, lagoon or other designated and permitted defined wastewater holding area.

8. A method of aerially disseminating and atmospherically disposing of the water component of all defined multicomponent leachates comprising: collecting the defined leachate which comprises a defined aqueous solution having multiple contaminating suspended and precipitated solids therein; directing this defined leachate under some pressure to an aerial dissemination and water component disposal or commonly known aerosolization system that includes a turbine; driving the turbine of the aerosolization system and generating a system of air that moves through a conduit associated with the aerial dissemination or aerosolization system; pumping the defined leachate under some pressure to a series of nozzles and aerially disseminating or Oxidatively Diffusing (OD) or commonly known aerosolizing the defined leachate into the path of the system of air passing through the conduit to form an air-raw leachate mixture for Liquid Particle Conversion (LPC); and directing the air-raw leachate mixture or Oxidative Diffusion (OD) from the aerosolization system and over a designated or permitted leachate collection area and causing the contaminating suspended and precipitated solids in the defined leachate to undergo Aerial Particle Conversion (APC) and Oxidative Liquid Conversion (OLC) out of the air-raw leachate mixture into the defined and designated or permitted suspended and precipitated solids collection area defined as between 1-200 meters from the nozzles of the IMAS.

9. The method of claim 8 wherein collecting the defined leachate includes channeling the leachate to or from a designated or defined or permitted tank, lined or unlined catch basin or lagoon and holding the defined, unfiltered or pre-conditioned leachate therein.

10. The method of claim 8 wherein the aerial dissemination and Atmospheric Disposal (AD) of the water component or commonly known aerosolization system includes an integrated and mobile aerosolization system (IMAS) and the method includes stationing the IMAS on a defined leachate generating site and moving the IMAS from one location to another in order to aerially disseminate and atmospherically dispose of the water component or commonly known word aerosolize the defined and unfiltered leachate around the site of the leachate's generation over the defined and designated or permitted leachate dissemination area.

11. The method of claim 10 wherein the IMAS is fully integrated and mobile and the method include moving the IMAS from point-to-point on the site of the defined leachate generation.

12. The method of claim 8 including maintaining a pressure of the defined leachate directed to the nozzles at a range of 20-150 psi depending on defined leachate solutions' characteristics.

13. The method of claim 8 wherein a ring pipe having the nozzles associated therewith is disposed in the conduit and the method includes aerially disseminating and atmospherically disposing of the water component or aerosolizing the defined leachate inwardly from the ring pipe and nozzles such that the Oxidative Diffusion (OD) or Liquid Particle Released (LPR) or now commonly known as aerosolized leachate is directed inwardly into the system of air passing through the conduit of the aerial contaminant dissemination and associated atmospheric water disposal system.

14. The method of claim 8: wherein the aerial dissemination and associated atmospheric water disposal system or commonly known aerosolization system comprises an integrated and mobile aerosolization system; wherein collecting the defined leachate includes channeling the leachate to or from the defined leachate generating site to a tank, lined or unlined catch basin or lagoon and holding the defined leachate therein; the method further including stationing the IMAS on the defined leachate generating site and moving the IMAS from one location to another to aerially disseminate and atmospherically dispose of the water component or aerosolize the air-raw leachate mixture over the site and permitted locations; and wherein the IMAS is fully integrated and mobile and the method includes moving the IMAS from defined or permitted point-to-point positions around the site.

15. A method of aerially disseminating and atmospherically disposing of the water component or commonly known as aerosolizing of unfiltered or preconditioned wastewaters having multiple detectable and contaminating suspended and precipitated solids comprising: (a) directing the defined wastewater to an aerial dissemination and atmospheric water component disposal system or aerosolization system having a turbine and one or more nozzles; (b) driving the turbine and generating a system of air that moves past the nozzles; (c) pumping the defined wastewater under some pressure to the nozzles and aerially disseminating and atmospherically disposing of the water component or commonly known as aerosolizing the unfiltered and unconditioned or unprepared defined wastewater emitted from the nozzles; (d) mixing the now Liquid Particle Dispersion (LPD) or aerosolized defined wastewater with the system of air generated by the turbine to form and Oxidative Diffusion (OD) or Oxidative Particle Release (OPR) from the air-raw wastewater mixture; (e) directing the Oxidative Particle Released (OPR) air-raw wastewater mixture from the aerosolization system and over a defined contaminating suspended and precipitated solids permitted collection area; and (f) wherein, as the Oxidatively Diffused (OD) air-wastewater mixture is directed over the defined or permitted collection area, the aerial disseminated or aerosolized air-raw wastewater mixture undergoes Aerial Particle Dispersion (APD) of the initially defined wastewater mixture onto the defined or permitted collection area while a substantial portion of the water component of the defined wastewater is liberated into the atmosphere.

16. The method of claim 15 wherein the aerial dissemination and atmospheric water component disposal or aerosolization system includes a conduit and a ring pipe disposed inside of the conduit and adjacent an interior surface of the conduit such that an open area is defined interiorly of the ring pipe and where the one or more nozzles includes a series of nozzles provided on the ring pipe; and wherein the method includes directing the defined wastewater under some pressure into the ring pipe and around the ring pipe and into the nozzles mounted on the ring pipe and directing the aerial disseminating and atmospheric water disposing system or aerosolizing system the defined wastewater inwardly from the ring pipe and the nozzles and mixing the liquid particle dispersion (LPD) or aerosolized defined wastewater with the system of air passing through the open area defined interiorly of the ring pipe.

17. The method of claim 15 wherein the defined wastewater comprises defined leachates and the method includes pumping the defined leachates under some pressure to the nozzles and aerially disseminating and atmospherically disposing of the water component contained therein or aerosolizing the defined leachate emitted from the nozzles.

18. The method of claim 15 wherein the aerial dissemination and atmospheric discharge or water component atmospheric disposal or aerosolization system comprises an integrated and mobile aerosolization system (IMAS).

* * * * *